United States Patent
Shahana

(10) Patent No.: US 11,124,267 B2
(45) Date of Patent: Sep. 21, 2021

(54) HUMAN-POWERED VEHICLE CONTROL DEVICE

(71) Applicant: Shimano Inc., Osaka (JP)

(72) Inventor: Satoshi Shahana, Osaka (JP)

(73) Assignee: Shimano Inc., Osaka (JP)

(*) Notice: Subject to any disclaimer, the term of this patent is extended or adjusted under 35 U.S.C. 154(b) by 347 days.

(21) Appl. No.: 16/163,983

(22) Filed: Oct. 18, 2018

(65) Prior Publication Data

US 2019/0127021 A1 May 2, 2019

(30) Foreign Application Priority Data

Oct. 31, 2017 (JP) .............................. JP2017-210988

(51) Int. Cl.
| | | |
|---|---|---|
| *B62M 6/50* | (2010.01) | |
| *B62M 9/04* | (2006.01) | |
| *B62M 23/02* | (2010.01) | |
| *B62M 6/45* | (2010.01) | |
| *B62M 6/40* | (2010.01) | |

(52) U.S. Cl.
CPC ............... *B62M 6/50* (2013.01); *B62M 9/04* (2013.01); *B62M 23/02* (2013.01); *B62M 6/40* (2013.01); *B62M 6/45* (2013.01)

(58) Field of Classification Search
CPC .......... B62M 6/50; B62M 9/04; B62M 23/02; B62M 6/45; B62M 6/40
See application file for complete search history.

(56) References Cited

U.S. PATENT DOCUMENTS

| | | | | |
|---|---|---|---|---|
| 3,873,128 | A * | 3/1975 | Dunder | B62M 11/12 |
| | | | | 280/236 |
| 2014/0251708 | A1* | 9/2014 | Yeh | B62M 6/50 |
| | | | | 180/206.3 |
| 2015/0345925 | A1 | 12/2015 | Smit et al. | |
| 2016/0016636 | A1* | 1/2016 | Thompson | B62M 6/45 |
| | | | | 74/594.7 |
| 2016/0090151 | A1* | 3/2016 | Bendel | B62M 11/12 |
| | | | | 180/206.3 |
| 2017/0106940 | A1* | 4/2017 | Paick | H01F 7/064 |
| 2017/0203814 | A1* | 7/2017 | Kurokawa | B62K 19/36 |

(Continued)

FOREIGN PATENT DOCUMENTS

| | | |
|---|---|---|
| CN | 1205954 A | 1/1999 |
| DE | 10 2017 208 291 A1 | 11/2017 |
| JP | 7-323880 A | 12/1995 |

(Continued)

*Primary Examiner* — Minnah L Seoh
*Assistant Examiner* — Marlon A Arce
(74) *Attorney, Agent, or Firm* — Global IP Counselors, LLP

(57) ABSTRACT

A human-powered vehicle control device includes an electronic controller operatively coupled to a motor that assists in propulsion of a human-powered vehicle. The controller is configured to control the motor in accordance with a human driving force that is input to the human-powered vehicle and is configured to change responsivity of an output torque of the motor to a change in the human driving force in accordance with a rider's pedaling posture of a rider of the human-powered vehicle. The human-powered vehicle control device is configured to change an output performance of the motor without operation of a switch.

18 Claims, 9 Drawing Sheets

(56) References Cited

U.S. PATENT DOCUMENTS

2018/0009503 A1  1/2018  Kinpara

FOREIGN PATENT DOCUMENTS

| JP | 8-127382 A | 5/1996 |
| JP | 2000-103382 A | 4/2000 |
| JP | 2000-177675 A | 6/2000 |
| JP | 5450194 B2 | 1/2014 |
| JP | 2018-1837 A | 1/2018 |

* cited by examiner

HUMAN-POWERED VEHICLE CONTROL DEVICE

CROSS-REFERENCE TO RELATED APPLICATIONS

This application claims priority to Japanese Patent Application No. 2017-210988, filed on Oct. 31, 2017. The entire disclosure of Japanese Patent Application No. 2017-210988 is hereby incorporated herein by reference.

BACKGROUND

Field of the Invention

The present invention generally relates to a human-powered vehicle control device.

Background Information

Japanese Laid-Open Patent Publication No. 7-323880 (Patent document 1) discloses one example of a known human-powered vehicle control device. The human-powered vehicle control device changes output performance of a motor as the rider operates a switch.

SUMMARY

With the human-powered vehicle control device described in the above mentioned in Patent document 1, the output performance of the motor cannot be changed unless the switch is operated. One object of the present disclosure is to provide a human-powered vehicle control device configured to change output performance of a motor without operation of a switch.

A first aspect of the present disclosure is a human-powered vehicle control device that includes an electronic controller operatively coupled to a motor that assists in propulsion of a human-powered vehicle. The controller is configured to control the motor in accordance with a human driving force that is input to the human-powered vehicle and is configured to change responsivity of an output torque of the motor to a change in the human driving force in accordance with a rider's pedaling posture of a rider of the human-powered vehicle. In accordance with the first aspect, the responsivity of the output torque of the motor to changes in human driving force is changed in accordance with the rider's pedaling posture. Thus, the output performance of the motor is changed without operation of a switch. Additionally, the motor is appropriately controlled in accordance with the rider's pedaling posture.

In accordance with a second aspect of the present disclosure, the human-powered vehicle control device according to the first aspect is configured so that the electronic controller is configured to change in accordance with the rider's pedaling posture at least one of a first responsivity of the responsivity in a case in which the human driving force decreases or a second responsivity of the responsivity in a case in which the human driving force increases. In accordance with the second aspect, at least one of the first responsivity and the second responsivity is changed. Thus, during a period in which the motor is controlled using at least one of the first responsivity and the second responsivity, the motor is appropriately controlled in accordance with the rider's pedaling posture.

In accordance with a third aspect of the present disclosure, the human-powered vehicle control device according to the second aspect is configured so that the controller changes the first responsivity in accordance with the rider's pedaling posture. In accordance with the third aspect, during a period in which the motor is controlled using the first responsivity, the motor is appropriately controlled in accordance with the rider's pedaling posture.

In accordance with a fourth aspect of the present disclosure, the human-powered vehicle control device according to the second or third aspect is configured so that the electronic controller is configured to change the first responsivity so that a delay in changing the output torque of the motor with relation to a change in the human driving force is smaller in a case in which the rider pedals in a standing posture as compared to a case in which the rider pedals in a sitting posture. In accordance with the fourth aspect, in a case in which the rider pedals in a standing posture and human driving force decreases, the output torque of the motor easily changes in accordance with changes in the human driving force. Thus, the motor is controlled in a manner suitable for standing pedaling and seated pedaling.

In accordance with a fifth aspect of the present disclosure, the human-powered vehicle control device according to the second aspect is configured so that the electronic controller is configured to change the second responsivity so that a delay in changing the output torque of the motor with relation to a change in the human driving force is smaller in a case in which the rider pedals in a standing posture as compared to a case in which the rider pedals in a sitting posture. In accordance with the fifth aspect, in a case in which the rider pedals in a standing posture and human driving force increases, the output torque of the motor easily changes in accordance with changes in the human driving force. Thus, the motor is controlled in a manner suitable for standing pedaling and seated pedaling.

A sixth aspect of the present disclosure is a human-powered vehicle control device that includes an electronic controller operatively coupled to a motor that assists in propulsion of a human-powered vehicle. The controller is configured to control the motor in accordance with a human driving force that is input to the human-powered vehicle so that an output torque of the motor is less than or equal to a predetermined value and is configured to change the predetermined value in accordance with a posture of a rider of the human-powered vehicle. In accordance with the sixth aspect, the torque that can be output from the motor is changed in accordance with the rider's pedaling posture. Thus, the motor is appropriately controlled in accordance with the rider's pedaling posture.

In accordance with a seventh aspect of the present disclosure, the human-powered vehicle control device according to the sixth aspect is configured so that the electronic controller is configured to increase the predetermined value in a case in which the rider pedals in a standing posture as compared to a case in which the rider pedals in a sitting posture. In accordance with the seventh aspect, in a case in which the rider pedals in a standing posture, the predetermined value is increased. Thus, the motor is controlled in a manner suitable for standing pedaling.

In accordance with an eighth aspect of the present disclosure, the human-powered vehicle control device according to any one of the first to seventh aspects is configured so that the electronic controller is configured to change a ratio of the output torque of the motor to the human driving force in accordance with the rider's pedaling posture. In accordance with the eighth aspect, the ratio of the output torque of the motor to human driving force is changed in accordance with the rider's pedaling posture. Thus, the motor is appropriately controlled in accordance with the rider's pedaling posture.

In accordance with a ninth aspect of the present disclosure, the human-powered vehicle control device according to the eighth aspect is configured so that the electronic controller is configured to increase the ratio of the output torque of the motor to the human driving force in a case in which the rider pedals in a standing posture as compared to a case in which the rider pedals in a sitting posture. In accordance with the ninth aspect, in a case in which the rider pedals in a standing posture, the ratio of the output torque of the motor to human driving force is increased. Thus, the motor is controlled in a manner suitable for standing pedaling.

In accordance with a tenth aspect of the present disclosure, the human-powered vehicle control device according to any one of the first to ninth aspects further includes a rider's pedaling posture detector operatively coupled to the electronic controller. In accordance with the tenth aspect, the rider's pedaling posture is appropriately detected with the first detector.

In accordance with an eleventh aspect of the present disclosure, the human-powered vehicle control device according to the tenth aspect is configured so that the rider's pedaling posture detector includes at least one of a crank force sensor, a pedal force sensor, a frame force sensor, a seatpost force sensor, a handlebar force sensor, a vehicle mounted camera, a roll direction inclination sensor, and a roll direction acceleration sensor. In accordance with the eleventh aspect, the rider's pedaling posture is appropriately detected with a sensor or camera included in the first detector.

A twelfth aspect of the present disclosure is a human-powered vehicle control device that includes an electronic controller operatively coupled to a motor that assists in propulsion of a human-powered vehicle in accordance with human driving force that is input to the human-powered vehicle. The electronic controller is configured to change responsivity of an output torque of the motor to a change in the human driving force in accordance with the human driving force. In accordance with the twelfth aspect, the responsivity of the output torque of the motor to changes in human driving force is changed in accordance with the human driving force. Thus, the motor is appropriately controlled in accordance with the driving force of the rider.

In accordance with a thirteenth aspect of the present disclosure, the human-powered vehicle control device according to the twelfth aspect is configured so that the electronic controller is configured to change in accordance with a rider's pedaling posture of a rider of the human-powered vehicle at least one of a first responsivity of the responsivity in a case in which the human driving force decreases or a second responsivity of the responsivity in a case in which the human driving force increases. In accordance with the thirteenth aspect, at least one of the first responsivity and the second responsivity is changed. Thus, during a period in which the motor is controlled using at least one of the first responsivity and the second responsivity, the motor is appropriately controlled in accordance with the rider's pedaling posture.

In accordance with a fourteenth aspect of the present disclosure, the human-powered vehicle control device according to the thirteenth aspect is configured so that the electronic controller is configured to change the first responsivity in accordance with the human driving force. In accordance with the fourteenth aspect, in a case in which driving force of the rider decreases, the motor is appropriately controlled in accordance with the rider's pedaling posture.

In accordance with a fifteenth aspect of the present disclosure, the human-powered vehicle control device according to the fourteenth aspect is configured so that the electronic controller is configured to change the first responsivity so that a delay in changing the output torque of the motor with relation to a change in the human driving force is smaller in a case in which the human driving force is greater than or equal to a first driving force as compared to a case in which the human driving force is less than the first driving force. In accordance with the fifteenth aspect, in a case in which human driving force is greater than or equal to the first driving force, the first responsivity is changed so that the response speed of the motor is increased. Thus, the motor is appropriately controlled in accordance with the driving force of the rider.

A sixteenth aspect of the present disclosure is a human-powered vehicle control device that includes an electronic controller operatively coupled a motor that assists in propulsion of a human-powered vehicle. The electronic controller is configured to control the motor in accordance with a human driving force that is input to the human-powered vehicle so that an output torque of the motor is less than or equal to a predetermined value and is configured to change the predetermined value in accordance with the human driving force. In accordance with the sixteenth aspect, the predetermined value is changed in accordance with human driving force. Thus, the motor is appropriately controlled in accordance with driving force of the rider.

In accordance with a seventeenth aspect of the present disclosure, the human-powered vehicle control device according to the sixteenth aspect is configured so that the electronic controller is configured to increase the predetermined value upon determining the human driving force is greater than or equal to a second driving force as compared to a case in which the human driving force is less than the second driving force. In accordance with the seventeenth aspect, in a case in which the human driving force is greater than or equal to the second driving force, the predetermined value is increased. Thus, the motor is appropriately controlled in accordance with driving force of the rider.

In accordance with an eighteenth aspect of the present disclosure, the human-powered vehicle control device according to any one of the first to seventeenth aspects further includes a human driving force detector operatively coupled to the electronic controller. In accordance with the eighteenth aspect, human driving force is appropriately detected with the second detector.

The human-powered vehicle control device according to the present disclosure changes the output performance of the motor without operation of a switch.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
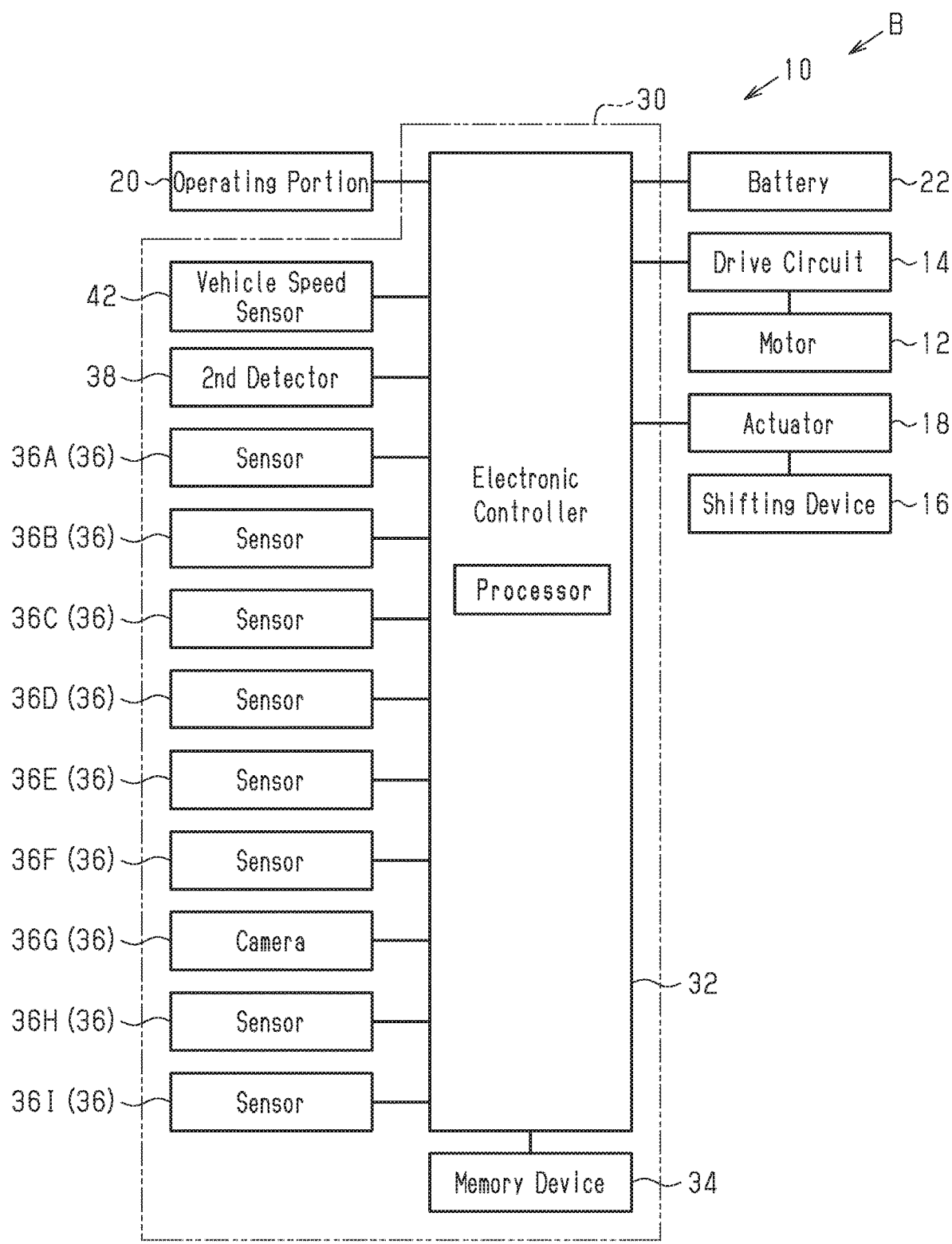
FIG. 1 is a block diagram showing an electrical configuration of a human-powered vehicle control device in accordance with a first embodiment.

One embodiment of a human-powered vehicle control device 30 will now be described with reference to FIG. 1. The human-powered vehicle control device 30 is provided on a human-powered vehicle B. The human-powered vehicle B is a vehicle configured to be driven by at least human driving force. The human-powered vehicle B includes, for example, a bicycle. The number of wheels in the human-powered vehicle B is not limited. The human-powered vehicle B, includes, for example, a unicycle and a vehicle having three or more wheels. The bicycle includes, for example, a mountain bike, a road bike, a city bike, a cargo bike, and a recumbent bike. In the embodiments described below, the human-powered vehicle B refers to a bicycle.

The human-powered vehicle B includes a frame, a crank, and a drive wheel. Human driving force is input to the crank. The crank includes a crankshaft rotatably supported by the frame and a pair of crank arms provided on two opposite ends of the crankshaft. Each of the crank arms is coupled to a pedal. The drive wheel is supported by the frame. The crank and the drive wheel are coupled by a drive mechanism. The drive mechanism includes a first rotary body coupled to the crankshaft. The crankshaft and the first rotary body may be coupled via a first one-way clutch. The first one-way clutch is configured to allow for forward rotation of the first rotary body in a case in which the crank rotates forward and restrict rearward rotation of the first rotary body in a case in which the crank rotates rearward. The first rotary body includes a sprocket, a pulley, or a bevel gear. The drive mechanism further includes a coupling member and a second rotary body. The coupling member transmits rotational force of the first rotary body to the second rotary body. The coupling member includes, for example, a chain, a belt, or a shaft.

The second rotary body is coupled to the drive wheel. The second rotary body includes a sprocket, a pulley, or a bevel gear. It is preferred that a second one-way clutch be provided between the second rotary body and the drive wheel. The second one-way clutch is configured to allow forward rotation of the drive wheel in a case in which the second rotary body rotates forward and restrict rearward rotation of the drive wheel in a case in which the second rotary body rotates rearward.

The human-powered vehicle B includes a front wheel and a rear wheel. In the following description of the embodiments, the rear wheel refers to the drive wheel. However, the front wheel can be the drive wheel.

A human-powered vehicle control system 10 includes a motor 12, a drive circuit 14 of the motor 12, a shifting device 16, an actuator 18 of the shifting device 16, an operating portion 20, a battery 22, and the human-powered vehicle control device 30.

It is preferred that the motor 12 and the drive circuit 14 be provided in the same housing. The drive circuit 14 controls electric power supplied from the battery 22 to the motor 12. The drive circuit 14 is connected to perform wired or wireless communication with an electronic controller 32 of the human-powered vehicle control device 30. The drive circuit 14 is configured to communicate with the controller 32, for example, through serial communication. The electronic controller 32 will hereafter be referred to simply as the controller 32. The drive circuit 14 drives the motor 12 in accordance with a control signal from the controller 32. The motor 12 assists propulsion of the human-powered vehicle B. The motor 12 includes an electric motor. The motor 12 is provided to transmit rotation to the front wheel or a transmission path of human driving force extending from the pedals to the rear wheel. The motor 12 is provided on the frame of the human-powered vehicle B, the rear wheel, or the front wheel. In one example, the motor 12 is coupled to the power transmission path between the crankshaft and the front rotary body. It is preferred that a one-way clutch be provided in the power transmission path between the motor 12 and the crankshaft so that in a case in which the crankshaft rotates in a direction moving the human-powered vehicle B forward, the rotational force of the crank will not rotate the motor 12. Components other than the motor 12 and the drive circuit 14 can be provided in the housing in which the motor 12 and the drive circuit 14 are provided. For example, a speed reduction unit can be provided to reduce speed of rotation of the motor 12 and output the rotation.

The shifting device 16 is configured to change a transmission ratio R of the human-powered vehicle B. The shifting device 16 is configured to change the transmission ratio R in a stepped manner. The actuator 18 has the shifting device 16 perform a shifting operation. The shifting device 16 is controlled by the controller 32. The actuator 18 is connected to perform wired or wireless communication with the controller 32. The actuator 18 is configured to communicate with the controller 32, for example, through power line communication (PLC). The actuator 18 has the shifting device 16 perform the shifting operation in accordance with a control signal from the controller 32. The shifting device 16 includes at least one of an internal shifting device and an external shifting device (derailleur). The shifting device 16 and the actuator 18 can be omitted. The shifting device 16 can be a shifting device operated by a wire.

The operating portion 20 is operable by the user. The operating portion 20 is configured to change a control mode of the motor 12 assisting propulsion of the human-powered vehicle B. The control mode includes an assist mode in which the motor 12 is driven in accordance with human driving force input to the human-powered vehicle B. It is preferred that the assist mode include multiple assist modes differing from each other in the strength of force assisting human driving force. The control mode can further include at least one of an off mode in which the motor 12 is not driven and a walk mode in which the motor 12 is driven in accordance with operation of the operating portion 20. The operating portion 20 is coupled to a handlebar of the human-powered vehicle B. The operating portion 20 includes, for example, an operating member, a sensor detecting movement of the operating member, and an electrical circuit communicating with the controller 32 in accordance with an output signal from the sensor. The operating portion 20 is connected to perform wired or wireless communication with the controller 32. The operating portion 20 is configured to communicate with the controller 32, for example, through PLC. As the user operates the operating portion 20, the operating portion 20 transmits an output signal to the controller 32. The operating portion 20 includes one or more operating members for changing the control mode of the motor 12. Each operating member includes a push switch, a lever-type switch, or a touchscreen. The operating portion 20 can include an operating member for driving the motor 12 in the walk mode.

The battery 22 includes one or more battery cells. Each battery cell includes a rechargeable battery. The battery 22 is provided on the human-powered vehicle B to supply electric power to other electric components, for example, the motor 12, the actuator 18, and the human-powered vehicle control device 30, which are electrically connected to the battery 22 by wires. The battery 22 is connected to perform wired or wireless communication with the controller 32. The battery 22 is configured to communicate with the controller 32, for example, through PLC. The battery 22 can be attached to the exterior of the frame or can be at least partially accommodated in the frame.

The human-powered vehicle control device 30 includes the controller 32. In one example, the human-powered vehicle control device 30 further includes a memory device 34, a first detector 36, a second detector 38, and a vehicle speed sensor 42.

The first detector 36 detects the rider's pedaling posture and can be considered a rider's pedaling posture detector. The first detector 36 includes at least one of sensors 36A, 36B, 36C, 36D, 36E, 36F, 36H, and 36I, and a camera 36G. The first detector 36 includes the sensors 36A, 36B, 36C, 36D, 36E, 36F, 36H, or 36I, the camera 36G or any combination of the sensors 36A, 36B, 36C, 36D, 36E, 36F, 36H, and 36I, and the camera 36G.

The sensor 36A is a crank force sensor that detects force applied to the crank of the human-powered vehicle B. The sensor 36A outputs a signal corresponding to force applied to the crank. In a case in which the rider pedals in a standing posture, the force applied to the crank is greater than in a case in which the rider pedals in a sitting posture. The controller 32 determines the rider's pedaling posture based on the amount of force applied to the crank detected by the sensor 36A. For example, upon determining a human driving force TA is changed from less than a first driving force TA1 to greater than or equal to the first driving force TA1, the controller 32 determines that the rider's pedaling posture has changed from sitting to standing. Upon determining the human driving force TA has changed from greater than or equal to the first driving force TA1 to less than the first driving force TA1, the controller 32 determines that the rider's pedaling posture has changed from standing to sitting. The controller 32 can be configured to determine that the rider's pedaling posture has changed from standing to sitting upon determining the human driving force TA has changed from greater than or equal to a third driving force TA3, which differs from the first driving force TA1, to less than the third driving force TA3.

The sensor 36B is a pedal force sensor that detects force applied to the pedals. The sensor 36B includes, for example, a pedal force meter or a power meter provided on the pedals. The sensor 36B outputs a signal corresponding to force applied to the pedals. In a case in which the rider pedals in a standing posture, the force applied to the pedals is greater than in a case in which the rider pedals in a sitting posture. The controller 32 determines the rider's pedaling posture based on the amount of force applied to the pedals detected by the sensor 36B. The controller 32 can be configured to determine that the rider is standing and pedaling, for example, in a case in which the amount of force applied to the pedals and the rotational angle of the crank satisfy a predetermined relationship. The controller 32 can be configured to determine that the rider is standing and pedaling in a case in which the amount of force applied to the pedals is greater than or equal to a predetermined value.

The sensor 36C is a frame force sensor that detects force applied to the frame. The sensor 36C is provided, for example, on the frame to detect strain of the frame. The sensor 36C outputs a signal corresponding to force applied to the frame. In a case in which the rider pedals in a standing posture, the strain of the frame is greater than in a case in which the rider pedals in a sitting posture. The controller 32 determines the rider's pedaling posture based on the amount of strain of the frame detected by the sensor 36C. The sensor 36C includes, for example, a strain sensor. The controller 32 determines that the rider is standing and pedaling, for example, in a case in which the amount of strain of the frame is greater than or equal to a predetermined value.

The sensor 36D is a saddle force sensor that detects force applied to a saddle. The sensor 36D is provided, for example, on the saddle to detect the load of the rider applied to the saddle. The sensor 36D outputs a signal corresponding to force applied to the saddle. In a case in which the rider pedals in a standing posture, the force applied to the saddle is smaller than in a case in which the rider pedals in a sitting posture. The controller 32 determines the rider's pedaling posture based on the amount of force applied to the saddle detected by the sensor 36D. The sensor 36D includes, for example, a pressure sensor. The controller 32 determines that the rider is standing and pedaling, for example, in a case in which the load of the rider applied to the saddle is less than a predetermined value.

The sensor 36E is a seatpost force sensor that detects force applied to a seatpost. The sensor 36E is provided, for example, on the seatpost to detect the load of the rider applied to the seatpost. The sensor 36E outputs a signal corresponding to force applied to the seatpost. In a case in which the rider pedals in a standing posture, the force applied to the seatpost is smaller than in a case in which the rider pedals in a sitting posture. The controller 32 determines the rider's pedaling posture based on the amount of force applied to the seatpost detected by the sensor 36E. The sensor 36E includes, for example, a strain sensor. The controller 32 determines that the rider is standing and pedaling, for example, in a case in which the load on the seatpost is less than a predetermined value.

The sensor 36F is a handlebar force sensor that detects force applied to the handlebar. The sensor 36F is provided, for example, on the handlebar to detect the load of the rider applied to the handlebar. The sensor 36F outputs a signal corresponding to force applied to the handlebar. In a case in which the rider pedals in a standing posture, the force applied to the handlebar is greater than in a case in which the rider pedals in a sitting posture. The controller 32 determines the rider's pedaling posture based on the amount of force applied to the handlebar detected by the sensor 36F. The sensor 36F includes, for example, a strain sensor. The controller 32 determines that the rider is standing and pedaling, for example, in a case in which the load on the handlebar is greater than or equal to a predetermined value.

The camera 36G is mounted on the human-powered vehicle B. The camera 36G is provided, for example, on the handlebar to capture an image at the rear of the handlebar. The camera 36G outputs an image of the rider. The controller 32 determines the rider's pedaling posture based on image data of the rider obtained by the camera 36G. The controller 32 compares, for example, the image data of the rider with predetermined image data and determines that the rider is standing and pedaling in a case in which the degree of similarity is higher than or equal to a predetermined value.

The sensor 36H detects an inclination of the human-powered vehicle B in a roll direction. The sensor 36H includes, for example, an inclination sensor. The inclination sensor includes, for example, at least one of a gyro sensor and an acceleration sensor. The inclination sensor can include the gyro sensor, an acceleration sensor, or both a gyro sensor and an acceleration sensor. The sensor 36H is provided, for example, on the frame to detect an inclination of the frame in the roll direction. The sensor 36H constitutes a roll direction inclination sensor. The sensor 36H outputs a signal corresponding to the inclination of the human-powered vehicle B in the roll direction. In a case in which the rider pedals in a standing posture, a moved amount of the frame in the roll direction is greater than in a case in which the rider pedals in a sitting posture. The controller 32 determines the rider's pedaling posture based on the inclination of the human-powered vehicle B in the roll direction detected by the sensor 36H. The controller 32 determines that the rider is standing and pedaling, for example, in a case in which the inclination of the frame in the roll direction repeatedly changes between being greater than or equal to a predetermined value and being less than the predetermined value.

The sensor 36I detects acceleration of the human-powered vehicle B in the roll direction. The sensor 36I includes, for example, an acceleration sensor. The sensor 36I is provided, for example, on the frame to detect acceleration of the frame in the roll direction. The sensor 36I constitutes a roll direction acceleration sensor. The sensor 36I outputs a signal corresponding to the acceleration of the human-powered vehicle B in the roll direction. In a case in which the rider pedals in a standing posture, the acceleration of the frame in the roll direction is greater than in a case in which the rider pedals in a sitting posture. The controller 32 determines the rider's pedaling posture based on the acceleration of the human-powered vehicle B in the roll direction detected by the sensor 36I. The controller 32 determines that the rider is standing and pedaling, for example, in a case in which the acceleration of the frame in the roll direction repeatedly changes between being greater than or equal to a predetermined value and being less than the predetermined value.

The second detector 38 detects the human driving force TA. The second detector 38 outputs a signal corresponding to the human driving force TA. The second detector 38 detects the human driving force TA input to the drive mechanism via the pedals. The second detector 38 can be arranged in a transmission path of the human driving force TA between the crankshaft and the front rotary body or on one of the crankshaft, the front rotary body, the crank arms, and the pedals. The second detector 38 can be realized using, for example, a strain sensor, an optical sensor, and a pressure sensor. The strain sensor includes a strain gauge, a magnetostriction sensor, and a piezoelectric sensor. Any sensor outputting a signal corresponding to the human driving force TA applied to the crank arms or the pedals can be used as the second detector 38. The second detector 38 is connected to perform wired or wireless communication with the controller 32. The second detector 38 sends a signal corresponding to the human driving force TA to the controller 32. The first detector 36 and the second detector 38 can include the same sensor. For example, in a case in which the first detector 36 includes the sensor 36A, the second detector 38 can also include the sensor 36A. In this case, the first detector 36 and the second detector 38 can be configured by a signal detector. The first detector 36 and the second detector 38 can include different sensors.

The vehicle speed sensor 42 detects a rotational speed of a wheel. The vehicle speed sensor 42 is electrically connected to the controller 32 through wired or wireless communication. The vehicle speed sensor 42 is attached to a chainstay of the frame. The vehicle speed sensor 42 is connected to perform wired or wireless communication with the controller 32. The vehicle speed sensor 42 outputs a signal corresponding to a change in the relative position between the vehicle speed sensor 42 and a magnet attached to the rear wheel to the controller 32. The controller 32 calculates a vehicle speed V of the human-powered vehicle B based on the rotational speed of the wheel. It is preferred that the vehicle speed sensor 42 include a magnetic reed forming a reed switch or a Hall element. The vehicle speed sensor 42 can be provided on a front fork and configured to detect a magnet attached to the front wheel.

The controller 32 includes an arithmetic processing unit executing predetermined control programs. The arithmetic processing unit includes, for example, a central processing unit (CPU) or a micro processing unit (MPU) that includes one or more processors. The controller 32 can include one or more microcomputers. The controller 32 can be formed of one or more semiconductor chips that are mounted on a printed circuit board. The term "electronic controller" or "controller" as used herein refers to hardware that executes a software program. The memory device 34 stores information used in various control programs and various control processes. The memory device 34 is any computer storage device or any computer readable medium with the sole exception of a transitory, propagating signal. The memory device 34 includes, for example, a nonvolatile memory and a volatile memory. The controller 32 and the memory device 34 are provided, for example, at the housing in which the motor 12 is provided.

The controller 32 is operatively coupled to the motor 12, and is configured to control the motor 12 in accordance with the human driving force TA input to the human-powered vehicle B. The controller 32 controls the motor 12 so that the ratio of an output torque TM of the motor 12 to the human driving force TA that is input to the human-powered vehicle B equals a ratio A. The human driving force TA and the output torque TM of the motor 12 are expressed in torque. The controller 32 is configured to control the motor 12 in a plurality of assist modes corresponding to different ratios A at least at some vehicle speeds V. In a case in which the assist mode includes, for example, three operating modes, namely, a first mode, a second mode, and a third mode, the ratio A includes a first ratio A1, a second ratio A2 that is smaller than the first ratio A1, and a third ratio A3 that is smaller than the second ratio A2. In the first mode, the ratio A is the first ratio A1. In the second mode, the ratio A is the second ratio A2. In the third mode, the ratio A is the third ratio A3. The assist mode can include two assist modes or four or more assist modes. Upon determining the vehicle speed V is higher than or equal to a predetermined speed, the controller 32 stops the driving of the motor 12. The predetermined speed is, for example, 25 km/h or 45 km/h.

The controller 32 changes the ratio A in accordance with a signal from the operating portion 20. The controller 32 changes the ratio A by changing the assist mode in accordance with a signal from the operating portion 20.

The controller 32 controls the motor 12 in accordance with the human driving force TA so that the output torque TM of the motor 12 is less than or equal to a predetermined value TMX. The predetermined value TMX is set to a value that is less than or equal to an upper limit value of the output torque TM corresponding to the output performance of the motor 12.

The controller 32 changes the responsivity of the output torque TM of the motor 12 to changes in the human driving force TA in accordance with the rider's pedaling posture of the human-powered vehicle B. The memory device 34 stores information related to the responsivity. The controller 32 changes a first responsivity and a second responsivity in accordance with the rider's pedaling posture. The change in the responsivity changes a delay D in changing the output torque TM of the motor 12 with relation to a change in the human driving force TA. In one example, the controller 32 changes the delay D by performing filtering on the human driving force TA. The controller 32 can be configured to change the delay D by performing filtering on an instruction signal to the motor 12. The controller 32 includes, for example, a low-pass filter. The filter includes a time constant.

The responsivity includes the first responsivity in a case in which the human driving force TA decreases and the second responsivity in a case in which the human driving force TA increases. It is preferred that the delay D in a case in which the first responsivity is set is greater than or equal to the delay D in a case in which the second responsivity is set. The controller 32 changes at least one of the first responsivity and the second responsivity in accordance with the rider's pedaling posture. The controller 32 can change only the first responsivity, only the second responsivity, or both the first responsivity and the second responsivity in accordance with the rider's pedaling posture. In the present embodiment, the controller 32 changes the first responsivity in accordance with the rider's pedaling posture. The controller 32 changes the first responsivity so that in a case in which the rider pedals in a standing posture, the delay D is smaller than in a case in which the rider pedals in a sitting posture.

The process for setting the output torque TM of the motor 12 will now be described with reference to FIG. 2. In a case in which the operating portion 20 is operated and the assist mode is set, the controller 32 starts the process and proceeds to step S11 in the flowchart of FIG. 2. As long as the assist mode is set, the controller 32 executes the process from step S11 in a predetermined cycle.

In step S11, the controller 32 determines whether or not the human driving force TA is decreasing. In a case in which the controller 32 determines that the human driving force TA is decreasing, the controller 32 proceeds to step S12. In step S12, the controller 32 sets the responsivity to the first responsivity and proceeds to step S14.

In a case in which the controller 32 determines in step S11 that the human driving force TA is not decreasing, the controller 32 proceeds to step S13. The controller 32 sets the responsivity to the second responsivity in step S13 and proceeds to step S14.

In step S14, the controller 32 calculates the output torque TM of the motor 12 based on the human driving force TA, the ratio A, and the responsivity. More specifically, the controller 32 calculates the output torque TM of the motor 12 by multiplying the ratio A and a numeral value that is obtained by performing filtering on the human driving force TA using the responsivity that is set in step S12 or S13. The controller 32 can be configured to calculate the output torque TM of the motor 12 by performing filtering on a numeral value that is obtained by multiplying the human driving force TA and the ratio A using the responsivity that is set in step S12 or S13.

In step S15, the controller 32 determines whether or not the output torque TM of the motor 12 calculated in step S14 is greater than the predetermined value TMX. In a case in which the controller 32 determines that the output torque TM of the motor 12 is greater than the predetermined value TMX, the controller 32 proceeds to step S16. In step S16, the controller 32 changes the output torque TM of the motor 12 calculated in step S14 to the predetermined value TMX and then proceeds to step S17. In step S17, the controller 32 controls the motor 12 so that the output torque TM of the motor 12 changed in step S16 is output from the motor 12 and ends the process.

In a case in which the controller 32 determines in step S15 that the output torque TM of the motor 12 is not greater than the predetermined value TMX, the controller 32 proceeds to step S17 without performing step S16. In this case, in step S17, the controller 32 controls the motor 12 so that the output torque TM of the motor 12 that is calculated in step S14 is output from the motor 12 and ends the process.

The process for changing the first responsivity will now be described with reference to FIG. 3. In a case in which the operating portion 20 is operated and the assist mode is set, the controller 32 starts the process and proceeds to step S21 in the flowchart of FIG. 3. As long as the assist mode is set, the controller 32 executes the process from step S21 in a predetermined cycle.

In step S21, the controller 32 determines whether or not the rider's pedaling posture has changed from sitting to standing. The controller 32 determines whether or not the rider's pedaling posture has changed from sitting to standing based on an output of the first detector 36. In a case in which the controller 32 determines that the rider's pedaling posture has changed from sitting to standing, the controller 32 proceeds to step S22.

The controller 32 changes the first responsivity so that the delay D is decreased in step S22 and proceeds to step S23. The controller 32 decreases the delay D, for example, by decreasing a time constant included in the filter in a case in which the first responsivity is used.

In step S23, the controller 32 determines whether or not the rider's pedaling posture has changed from standing to sitting. The controller 32 determines whether or not the rider's pedaling posture has changed from standing to sitting based on an output of the first detector 36. In a case in which the controller 32 determines that the rider's pedaling posture has not changed from standing to sitting, the controller 32 repeats the determination process of step S23. In a case in which the controller 32 determines that the rider's pedaling posture has changed from standing to sitting, the controller 32 proceeds to step S24.

The controller 32 changes the first responsivity so that the delay D is increased in step S24 and ends the process. The controller 32 increases the delay D, for example, by increasing a time constant included in the filter in a case in which the first responsivity is used. It is preferred that the delay D that is set in step S24 in the case of using the first responsivity be equal to the delay D that has not been changed by step S22.

Figure 2:
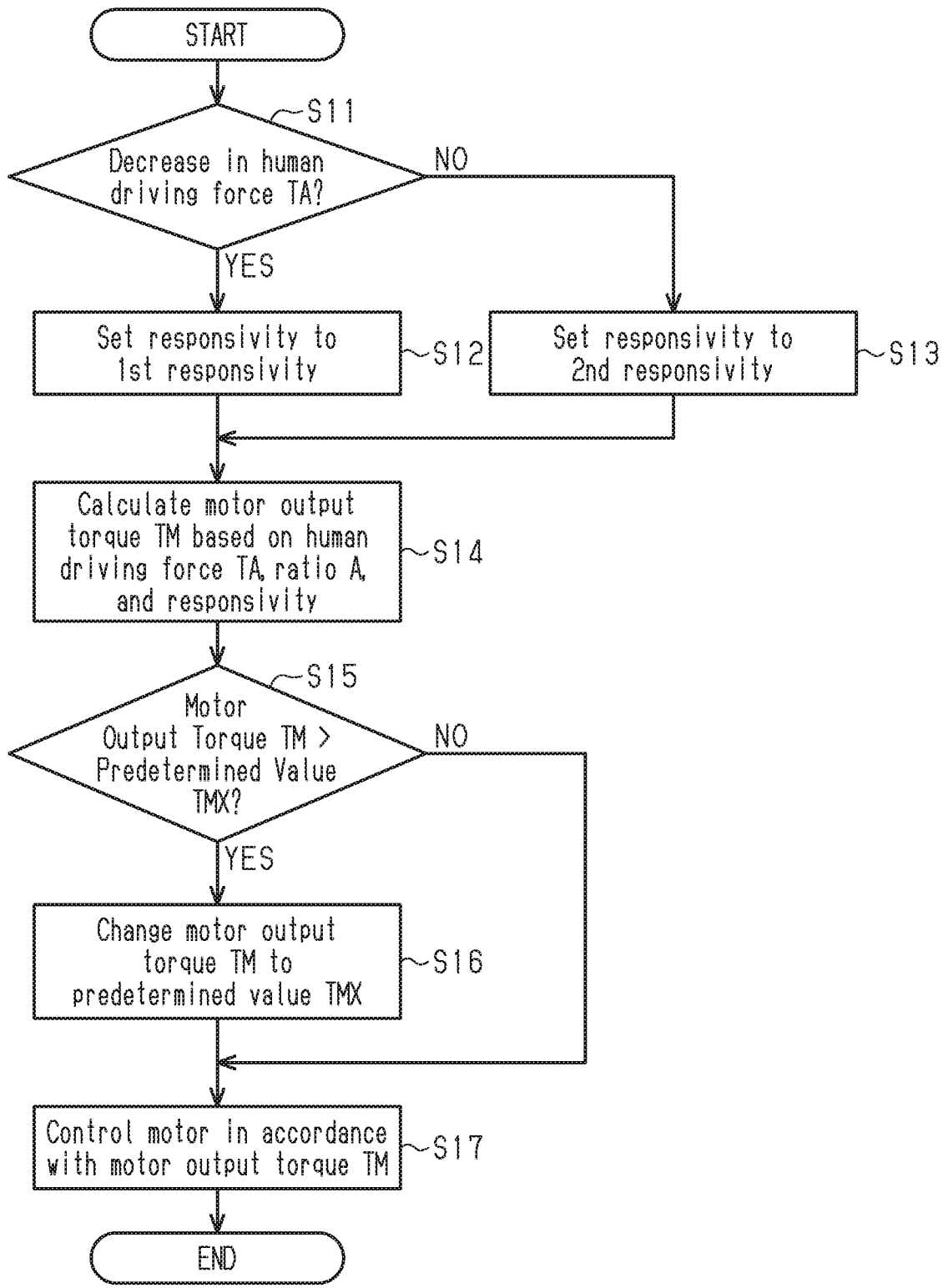
FIG. 2 is a flowchart of a control process setting an output torque T of a motor that is executed by an electronic controller of a human-powered vehicle control device shown in FIG. 1.
Figure 3:
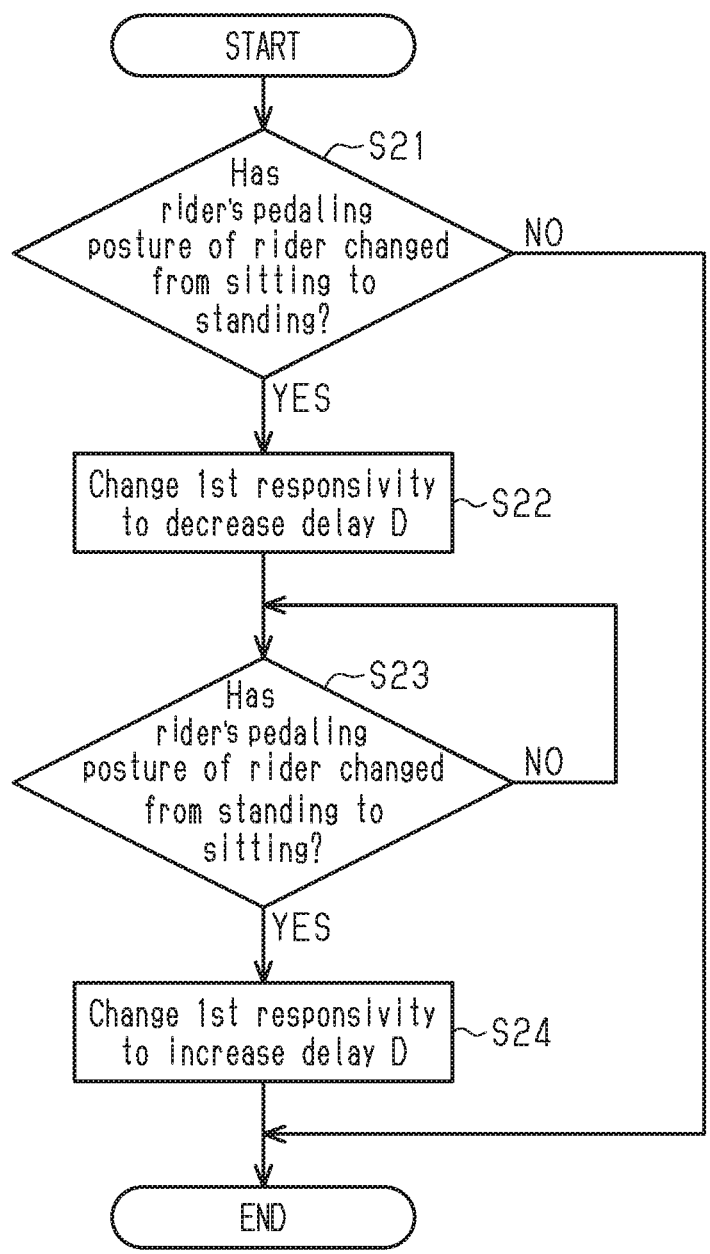
FIG. 3 is a flowchart of a control process changing a first responsivity that is executed by the electronic controller of a human-powered vehicle control device shown in FIG. 1.

The controller 32 executes steps S12 and S14 in FIG. 2 using the first responsivity that is set through the process of FIG. 3.

Figure 4:
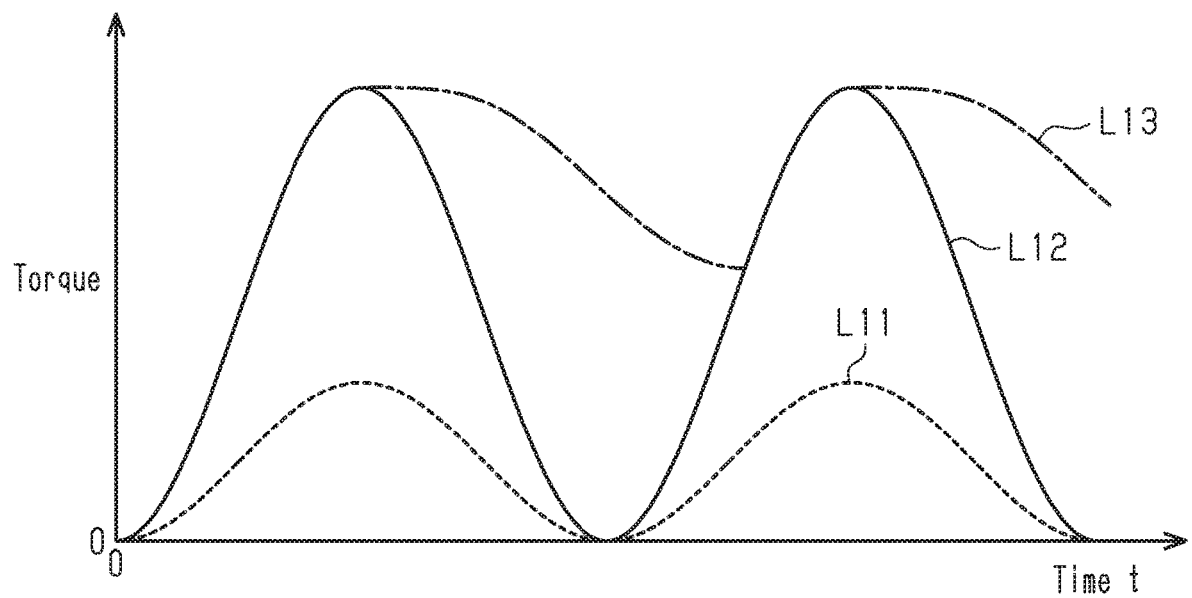
FIG. 4 is a graph showing a relationship between a human driving force and an output torque of the motor controlled by the human-powered vehicle control device of the first embodiment.

The broken line L11 shown in FIG. 4 shows one example of changes in the human driving force TA with respect to time. The human driving force TA cyclically changes in accordance with the rotational angle of the crank. The solid line L12 shown in FIG. 4 shows changes in the output torque TM of the motor 12 in a case in which the rider pedals in a standing posture with input of the human driving force TA indicated by the broken line L11. The single-dashed line L13 shown in FIG. 4 shows changes in the output torque TM of the motor 12 in a case in which the rider pedals in a sitting posture with input of the human driving force TA indicated by the broken line L11 where the human driving force TA is decreasing. As indicated by the single-dashed line L13 in FIG. 4, in a case in which the rider pedals in a sitting posture, the decrease rate of the output torque TM of the motor 12 is small. On the other hand, with regard to changes in the output torque TM of the motor 12, as indicated by the solid line L12 in FIG. 4, in a case in which the rider pedals in a standing posture, the decrease rate of the output torque TM of the motor 12 is greater than in a case in which the rider pedals in a sitting posture.

Figure 5:
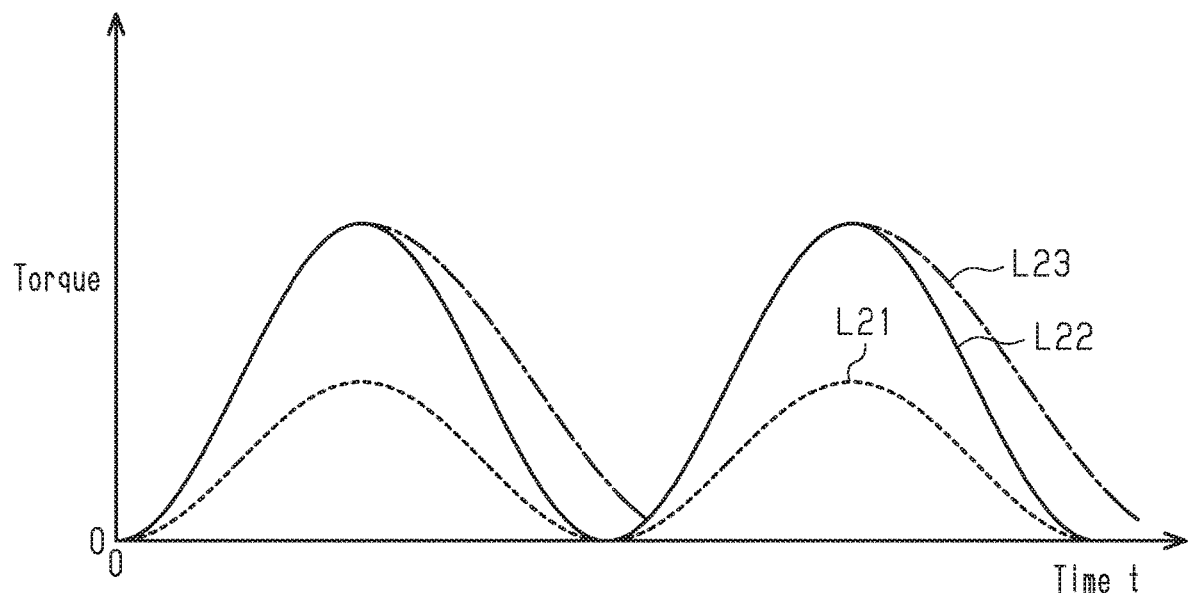
FIG. 5 is a graph showing the relationship between the human driving force and the output torque of the motor in an assist mode corresponding to a lower ratio than that of FIG. 4.

FIG. 5 shows changes in the output torque TM of the motor 12 in a case in which an assist mode corresponding to a lower ratio A than that of FIG. 4 is set. The broken line L21 shown in FIG. 5 shows one example of changes in the human driving force TA with respect to time. The human driving force TA indicated by the broken line L21 in FIG. 5 is the same as the human driving force TA indicated by the broken line L11 in FIG. 4. The solid line L22 in FIG. 5 shows changes in the output torque TM of the motor 12 in a case in which the rider pedals in a standing posture. The single-dashed line L23 shown in FIG. 5 shows changes in the output torque TM of the motor 12 in a case in which the rider pedals in a sitting posture and the human driving force TA is decreasing.

Second Embodiment

Figure 6:
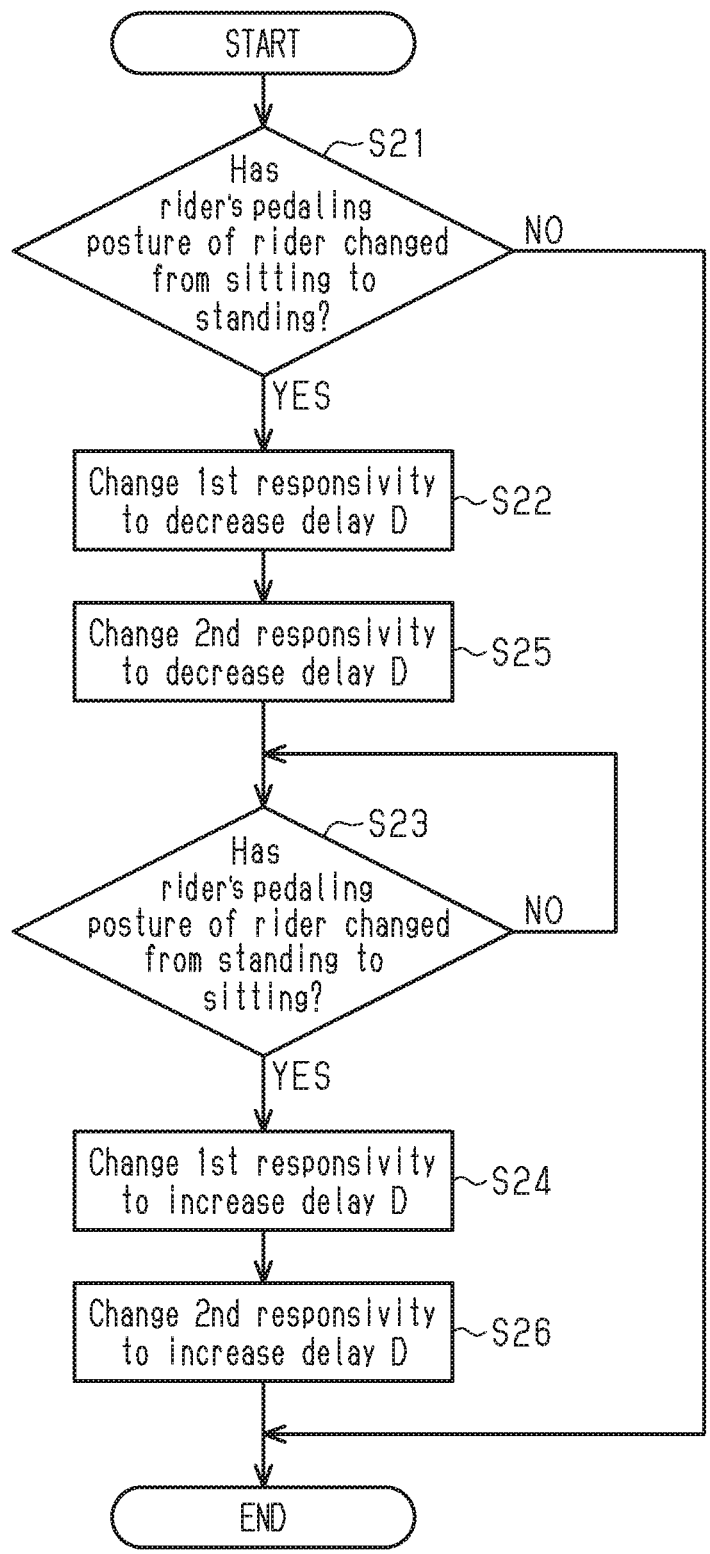
FIG. 6 is a flowchart of a control process changing a first responsivity and a second responsivity that is executed by a second embodiment of an electronic controller.

A second embodiment of the human-powered vehicle control device 30 will now be described with reference to FIGS. 1 and 6. The human-powered vehicle control device 30 of the second embodiment is the same as the human-powered vehicle control device 30 of the first embodiment except that the process for changing the first responsivity and the second responsivity shown in FIG. 6 is executed instead of the process for changing the first responsivity shown in FIG. 3. Same reference characters are given to those elements that are the same as the corresponding elements of the first embodiment. Such elements will not be described in detail.

The controller 32 changes at least one of the first responsivity and the second responsivity in accordance with the rider's pedaling posture. The controller 32 can change only the first responsivity, only the second, or both the first responsivity and the second responsivity in accordance with the rider's pedaling posture. In the present embodiment, the controller 32 changes the first responsivity and the second responsivity in accordance with the rider's pedaling posture. The controller 32 changes the first responsivity so that in a case in which the rider pedals in a standing posture, the delay D is smaller than in a case in which the rider pedals in a sitting posture. The controller 32 changes the second responsivity so that in a case in which the rider pedals in a standing posture, the delay D is smaller than in a case in which the rider pedals in a sitting posture.

The process for changing the first responsivity and the second responsivity will now be described with reference to FIG. 6. In a case in which the operating portion 20 is operated and the assist mode is set, the controller 32 starts the process and proceeds to step S21 in the flowchart of FIG. 6. As long as the assist mode is set, the controller 32 executes the process from step S21 in a predetermined cycle.

In step S21, the controller 32 determines whether or not the rider's pedaling posture has changed from sitting to standing. The controller 32 determines whether or not the rider's pedaling posture has changed from sitting to standing based on an output of the first detector 36. In a case in which the controller 32 determines that the rider's pedaling posture has changed from sitting to standing, the controller 32 proceeds to step S22.

The controller 32 changes the first responsivity so that the delay D is decreased in step S22 and proceeds to step S25. The controller 32 decreases the delay D, for example, by decreasing a time constant included in the filter in which the first responsivity is used. The controller 32 changes the second responsivity so that the delay D is decreased in step S25 and proceeds to step S23. The controller 32 decreases the delay D, for example, by decreasing a time constant included in the filter in which the second responsivity is used. The order can be switched between step S22 and step S25.

In step S23, the controller 32 determines whether or not the rider's pedaling posture has changed from standing to sitting. The controller 32 determines whether or not the rider's pedaling posture has changed from standing to sitting based on an output of the first detector 36. In a case in which the controller 32 determines that the rider's pedaling posture has not changed from standing to sitting, the controller 32 repeats the determination process of step S23. In a case in which the controller 32 determines that the rider's pedaling posture has changed from standing to sitting, the controller 32 proceeds to step S24.

The controller 32 changes the first responsivity so that the delay D is increased in step S24 and proceeds to step S26. The controller 32 increases the delay D, for example, by increasing a time constant included in the filter in which the first responsivity is used. It is preferred that the delay D that is set in step S24 in the case of using the first responsivity be equal to the delay D that has not been changed by step S22.

The controller 32 changes the second responsivity so that the delay D is increased in step S26 and ends the process.

The controller 32 increases the delay D, for example, by increasing a time constant included in the filter in which the second responsivity is used. It is preferred that the delay D that is set in step S26 in the case of using the second responsivity be equal to the delay D that has not been changed by step S25. The order can be switched between step S24 and step S26. The controller 32 executes steps S12 and S14 shown in FIG. 2 using the first responsivity that is set through the process of FIG. 6. The controller 32 executes steps S13 and S14 shown in FIG. 2 using the second responsivity that is set through the process of FIG. 6.

Third Embodiment

Figure 7:
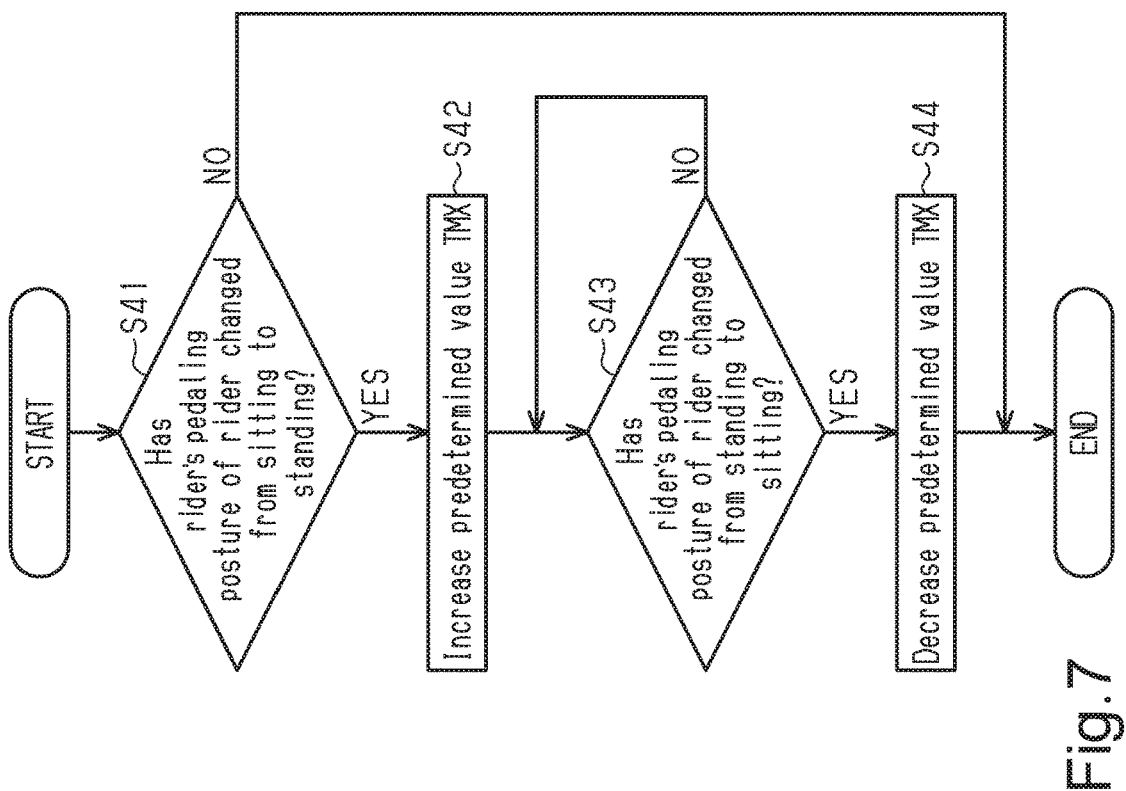
FIG. 7 is a flowchart of a control process changing the predetermined value of output torque of the motor that is executed by a third embodiment of an electronic controller.

A third embodiment of the human-powered vehicle control device 30 will now be described with reference to FIGS. 1 and 7. The human-powered vehicle control device 30 of the third embodiment is the same as the human-powered vehicle control device 30 of the first embodiment except that the process for changing the predetermined value TMX shown in FIG. 7 is executed instead of the process for changing the first responsivity shown in FIG. 3. Same reference characters are given to those elements that are the same as the corresponding elements of the first embodiment. Such elements will not be described in detail.

The controller 32 changes the predetermined value TMX in accordance with the rider's pedaling posture. In a case in which the rider pedals in a standing posture, the controller 32 increases the predetermined value TMX as compared to a case in which the rider pedals in a sitting posture.

The process for changing the predetermined value TMX will now be described with reference to FIG. 7. In a case in which the operating portion 20 is operated and the assist mode is set, the controller 32 starts the process and proceeds to step S41 in the flowchart of FIG. 7. As long as the assist mode is set, the controller 32 executes the process from step S41 in a predetermined cycle.

In step S41, the controller 32 determines whether or not the rider's pedaling posture has changed from sitting to standing. In a case in which the controller 32 determines that the rider's pedaling posture has not changed from sitting to standing, the controller 32 ends the process. In a case in which the controller 32 determines that the rider's pedaling posture has changed from sitting to standing, the controller 32 proceeds to step S42.

The controller 32 increases the predetermined value TMX in step S42 and proceeds to step S43. In step S43, the controller 32 determines whether or not the rider's pedaling posture has changed from standing to sitting. In a case in which the controller 32 determines that the rider's pedaling posture has not changed from standing to sitting, the controller 32 again performs the determination process of step S43. In a case in which the controller 32 determines that the rider's pedaling posture has changed from standing to sitting, the controller 32 proceeds to step S44. The controller 32 decreases the predetermined value TMX in step S44 and ends the process. In step S44, it is preferred that the controller 32 changes the predetermined value TMX back to the predetermined value TMX that has not been increased by step S42.

Fourth Embodiment

Figure 8:
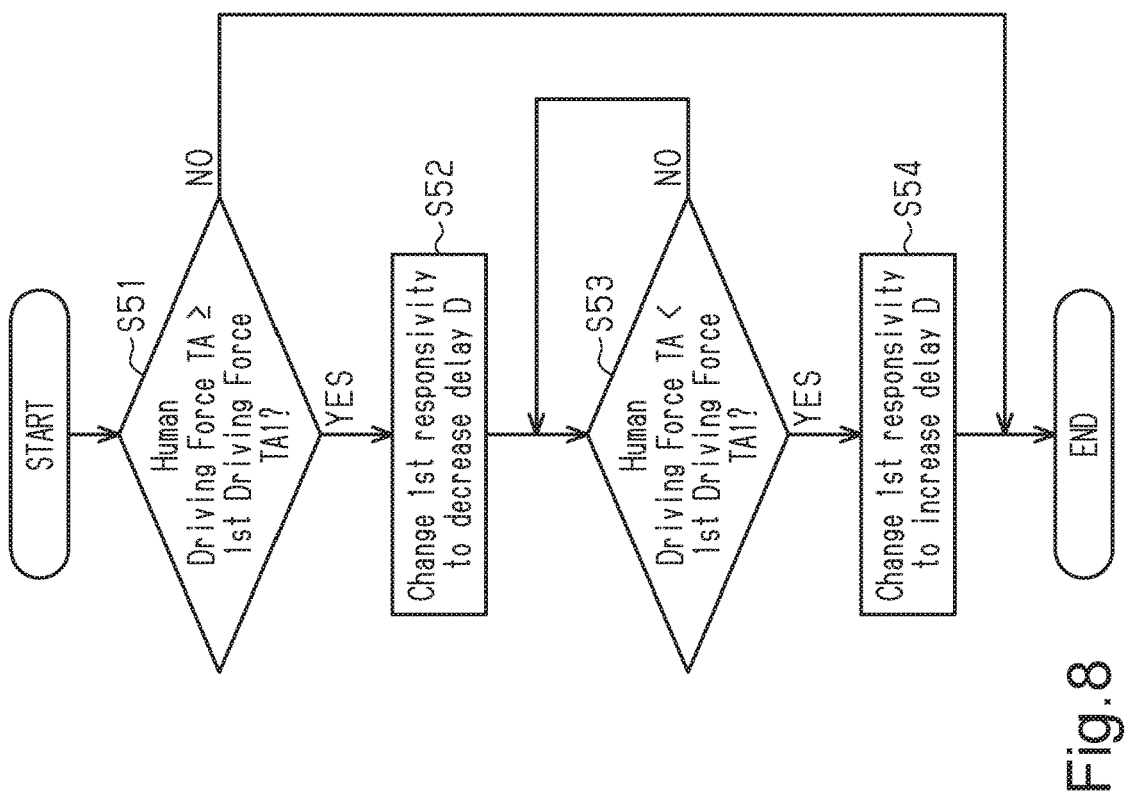
FIG. 8 is a flowchart of a control process changing a first responsivity of the motor that is executed by a fourth embodiment of an electronic controller.

A fourth embodiment of the human-powered vehicle control device 30 will now be described with reference to FIGS. 1 and 8. The human-powered vehicle control device 30 of the fourth embodiment is the same as the human-powered vehicle control device 30 of the first embodiment except that the process for changing the first responsivity shown in FIG. 8 is executed instead of the process for changing the first responsivity shown in FIG. 3. Same reference characters are given to those elements that are the same as the corresponding elements of the first embodiment. Such elements will not be described in detail.

The controller 32 is configured to change the responsivity in accordance with the human driving force TA. The controller 32 changes the first responsivity in accordance with the human driving force TA. The controller 32 changes the first responsivity so that in a case in which the human driving force TA is greater than or equal to the first driving force TA1, the delay D is smaller than in a case in which the human driving force TA is less than the first driving force TA1.

The process for changing the first responsivity will now be described with reference to FIG. 8. In a case in which the operating portion 20 is operated and the assist mode is set, the controller 32 starts the process and proceeds to step S51 in the flowchart of FIG. 8. As long as the assist mode is set, the controller 32 executes the process from step S51 in a predetermined cycle.

In step S51, the controller 32 determines whether or not the human driving force TA is greater than or equal to the first driving force TA1. In a case in which the controller 32 determines that the human driving force TA is not greater than or equal to the first driving force TA1, the controller 32 ends the process. In a case in which the controller 32 determines that the human driving force TA is greater than or equal to the first driving force TA1, the controller 32 proceeds to step S52.

The controller 32 changes the first responsivity so that the delay D is decreased in step S52 and proceeds to step S53. The controller 32 decreases the delay D, for example, by decreasing a time constant included in the filter in which the first responsivity is used.

In step S53, the controller 32 determines whether or not the human driving force TA is less than the first driving force TA1. In a case in which the controller 32 determines that the human driving force TA is not less than the first driving force TA1, the controller 32 repeats the determination process of step S53. In a case in which the controller 32 determines that the human driving force TA is less than the first driving force TA1, the controller 32 proceeds to step S54.

The controller 32 changes the first responsivity so that the delay D is increased in step S54 and ends the process. The controller 32 increases the delay D, for example, by increasing a time constant included in the filter in which the first responsivity is used. It is preferred that the delay D that is set in step S54 in the case of using the first responsivity be equal to the delay D that has not been changed by step S52.

In a case in which the human driving force TA is greater than or equal to the first driving force TA1, the controller 32 changes the first responsivity so that the delay D is decreased. Thus, even when the rider's pedaling posture remains the same, in a case in which the human driving force TA is large, the human-powered vehicle B provides an assist corresponding to a change in the human driving force TA. The rider subtly perceives awkwardness.

Fifth Embodiment

Figure 9:
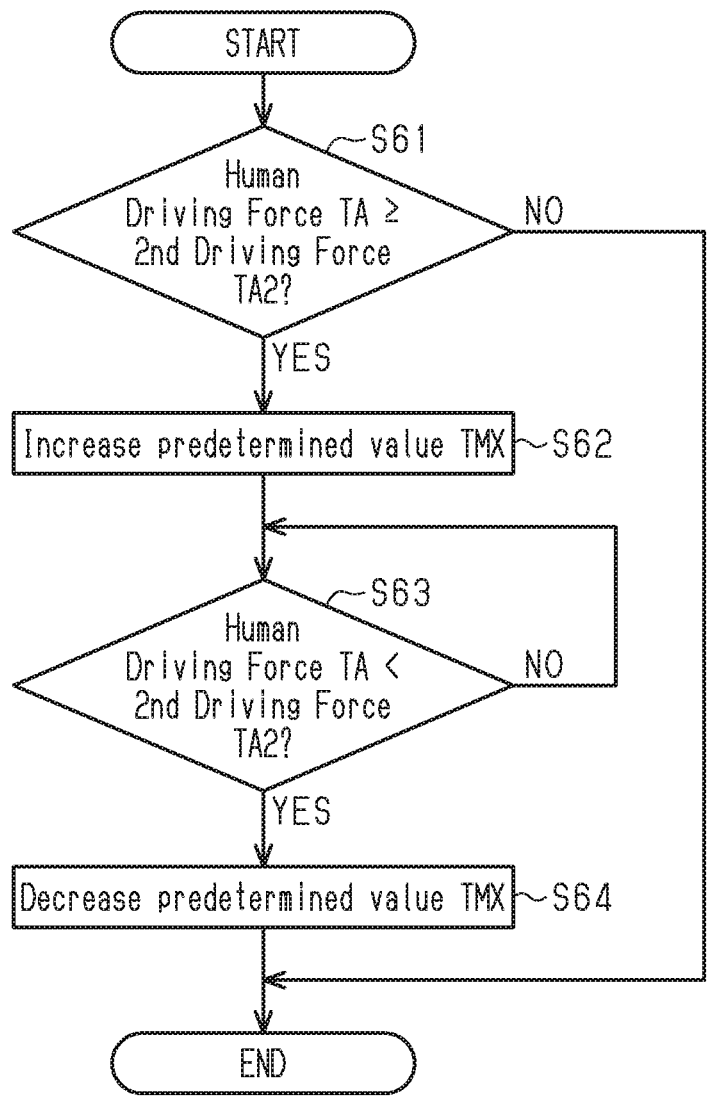
FIG. 9 is a flowchart of a control process changing the predetermined value of output torque of the motor that is executed by a fifth embodiment of an electronic controller.

A fifth embodiment of the human-powered vehicle control device 30 will now be described with reference to FIGS. 1 and 9. The human-powered vehicle control device 30 of the fifth embodiment is the same as the human-powered vehicle control device 30 of the third embodiment except that the process for changing the predetermined value TMX shown in FIG. 9 is executed instead of the process for changing the predetermined value TMX shown in FIG. 7. Same reference characters are given to those elements that are the same as the corresponding elements of the third embodiment. Such elements will not be described in detail.

The controller 32 is configured to control the motor 12 so that the output torque TM of the motor 12 is less than or equal to the predetermined value TMX in accordance with the human driving force TA. The controller 32 changes the predetermined value TMX in accordance with the human driving force TA. In a case in which the human driving force TA is greater than or equal to a second driving force TA2, the controller 32 increases the predetermined value TMX as compared to a case in which the human driving force TA is less than the second driving force TA2.

The process for changing the predetermined value TMX will now be described with reference to FIG. 9. In a case in which the operating portion 20 is operated and the assist mode is set, the controller 32 starts the process and proceeds to step S61 in the flowchart of FIG. 9. As long as the assist mode is set, the controller 32 executes the process from step S61 in a predetermined cycle.

In step S61, the controller 32 determines whether or not the human driving force TA is greater than or equal to the second driving force TA2. In a case in which the controller 32 determines that the human driving force TA is not greater than or equal to the second driving force TA2, the controller 32 ends the process. In a case in which the controller 32 determines that the human driving force TA is greater than or equal to the second driving force TA2, the controller 32 proceeds to step S62.

The controller 32 increases the predetermined value TMX in step S62 and proceeds to step S63. In step S63, the controller 32 determines whether or not the human driving force TA is less than the second driving force TA2. In a case in which the controller 32 determines that the human driving force TA is not less than the second driving force TA2, the controller 32 again executes the determination process of step S63. In a case in which the controller 32 determines that the human driving force TA is less than the second driving force TA2, the controller 32 proceeds to step S64. The controller 32 decreases the predetermined value TMX in step S64 and ends the process. In step S64, it is preferred that the controller 32 changes the predetermined value TMX back to the predetermined value TMX that has not been increased by step S62.

Modifications

The description related to the above embodiments exemplifies, without any intention to limit, applicable forms of a human-powered vehicle control device according to the present disclosure. The human-powered vehicle control device according to the present disclosure is applicable to, for example, modifications of the above embodiments that are described below and combinations of at least two of the modifications that do not contradict each other. In the modifications, same reference characters are given to those elements that are the same as the corresponding elements of the embodiments. Such elements will not be described in detail.

In each embodiment, the controller 32 can change the ratio A in accordance with the rider's pedaling posture. In a case in which the rider pedals in a standing posture, the controller 32 increases the ratio A as compared to a case in which the rider pedals in a sitting posture.

Figure 10:
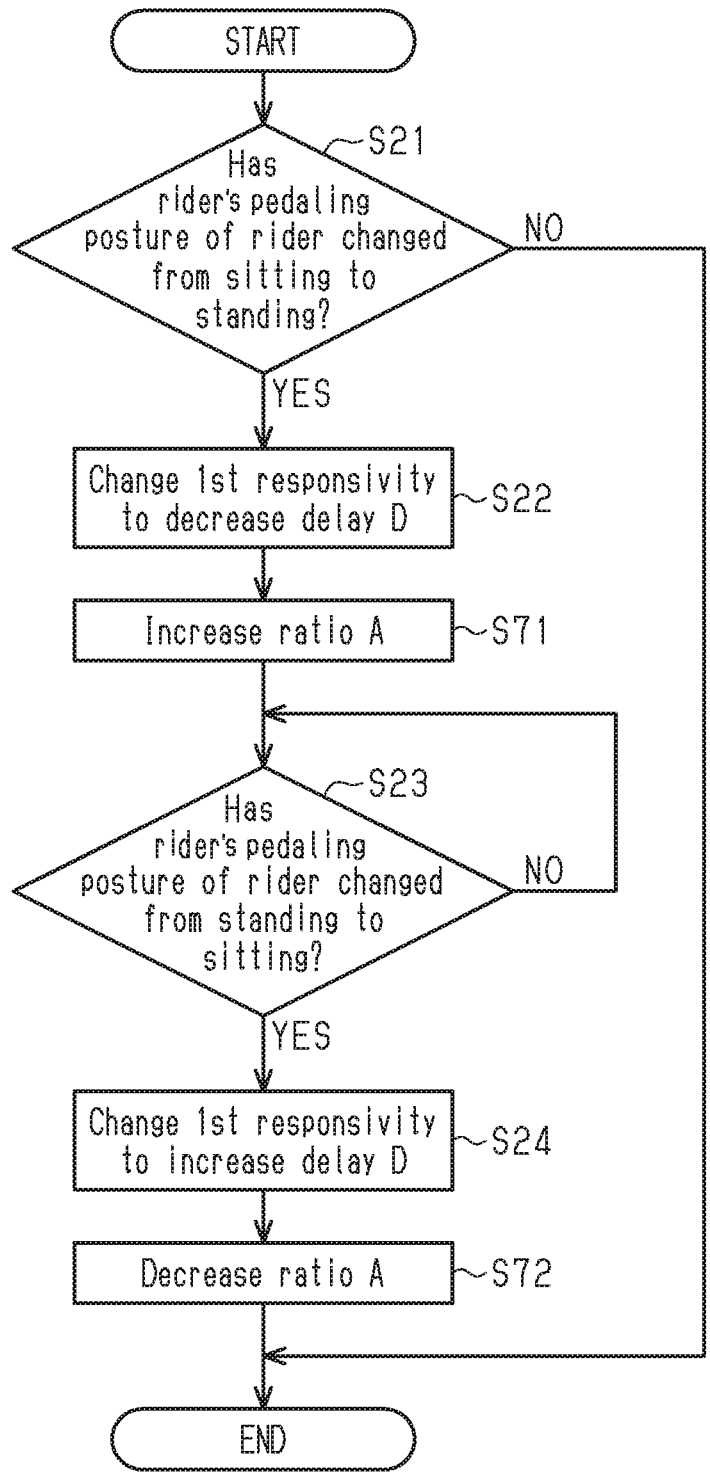
FIG. 10 is a flowchart of a control process changing a first responsivity and a ratio that is executed by a modification of the electronic controller of the first embodiment.

For example, in the first embodiment, the controller 32 can execute the process shown in the flowchart of FIG. 10. In the flowchart of FIG. 10, the same reference characters are given to those steps that are the same as the corresponding steps in the flowchart of FIG. 3. Such steps will not be described in detail. After step S22, the controller 32 proceeds to step S71. The controller 32 increases the ratio A in step S71 and proceeds to step S23. The controller 32 increases the ratio A, for example, by changing the assist mode so that the ratio A is increased by one step. After step S24, the controller 32 proceeds to step S72. The controller 32 decreases the ratio A in step S72 and ends the process. In step S72, it is preferred that the controller 32 change the ratio A back to the ratio A that has not been increased by step S71. The controller 32 decreases the ratio A, for example, by changing the assist mode so that the ratio A is decreased by one step.

Figure 11:
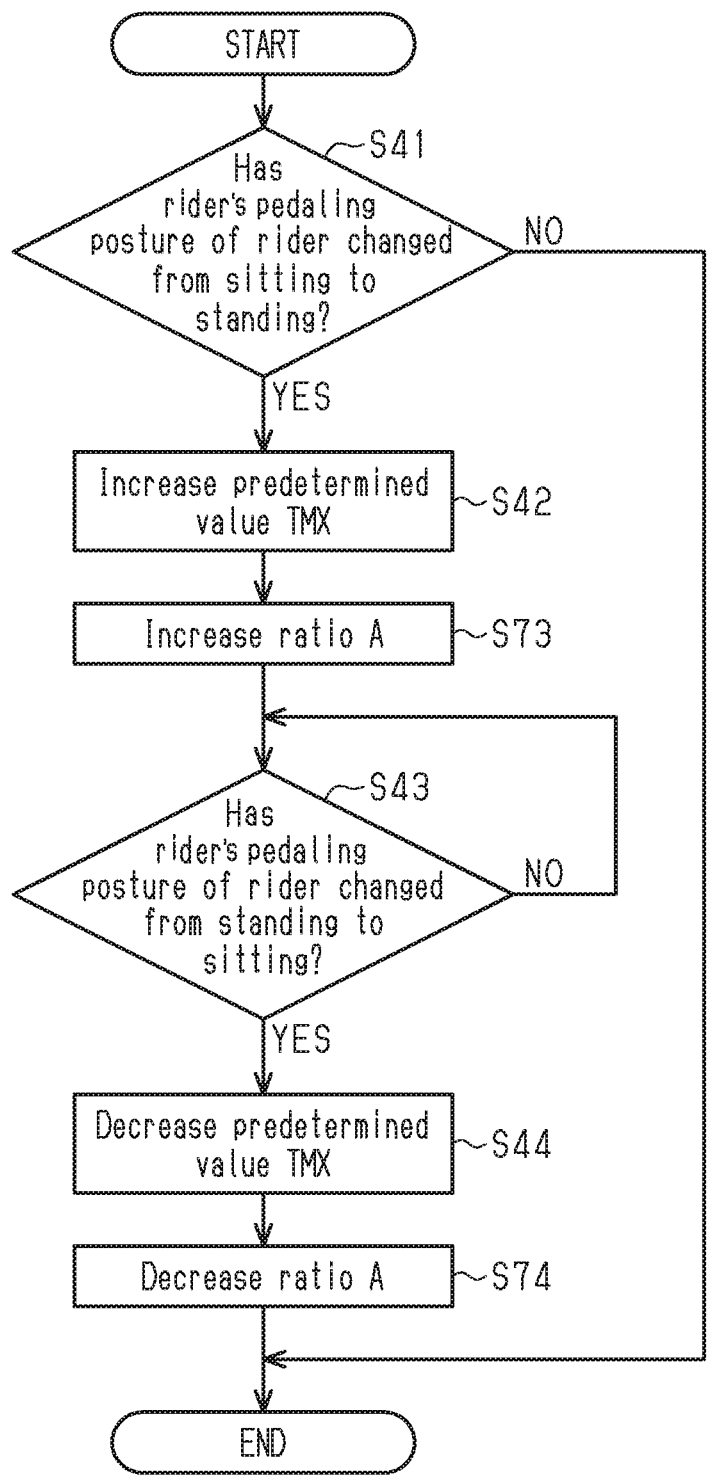
FIG. 11 is a flowchart of a control process changing the predetermined value of output torque of the motor and the ratio that is executed by a modification of the electronic controller of the third embodiment.

For example, in the third embodiment, the controller 32 can execute the process shown in the flowchart of FIG. 11. In the flowchart of FIG. 11, the same reference characters are given to those steps that are the same as the corresponding steps in the flowchart of FIG. 7. Such steps will not be described in detail. After step S42, the controller 32 proceeds to step S73. The controller 32 increases the ratio A in step S73 and proceeds to step S43. The controller 32 increases the ratio A, for example, by changing the assist mode so that the ratio A is increased by one step. After step S44, the controller 32 proceeds to step S74. The controller 32 decreases the ratio A in step S74 and ends the process. In step S74, it is preferred that the controller 32 change the ratio A back to the ratio A that has not been increased by step S73. The controller 32 decreases the ratio A, for example, by changing the assist mode so that the ratio A is decreased by one step.

In the second embodiment, the controller 32 can change only the second responsivity in accordance with the rider's pedaling posture. For example, steps S22 and S24 are omitted from the flowchart in FIG. 6.

In the third embodiment, the controller 32 can change at least one of the first responsivity and the second responsivity in accordance with the rider's pedaling posture. The controller 32 can change the first responsivity, the second responsivity, or both the first responsivity and the second responsivity in accordance with the rider's pedaling posture. For example, after step S42 in FIG. 7, steps S22 and S25 of FIG. 6 are executed. Steps S22 and S25 can be executed before step S42. Additionally, for example, after step S44 in FIG. 7, steps S24 and S26 of FIG. 6 are executed. Steps S24 and S26 can be executed before step S44.

In the fourth embodiment, the second responsivity can be changed in accordance with the human driving force TA. For example, after step S52 in FIG. 8, the controller 32 changes the second responsivity so that the delay D is decreased and proceeds to step S53. After step S54 in FIG. 8, the controller 32 changes the second responsivity so that the delay D is increased and ends the process.

In the fifth embodiment, the controller 32 can change at least one of the first responsivity and the second responsivity in accordance with the human driving force TA. The controller 32 can change only the first responsivity, only the second responsivity, or both the first responsivity and the second responsivity in accordance with the human driving force TA. For example, after step S62 in FIG. 9, steps S22 and S25 of FIG. 6 are executed. Steps S22 and S25 can be executed before step S62. Additionally, for example, after step S64 in FIG. 9, steps S24 and S26 of FIG. 6 are executed. Steps S24 and S26 can be executed before step S64.

What is claimed is:

1. A human-powered vehicle control device comprising:
an electronic controller operatively coupled to a motor that assists in propulsion of a human-powered vehicle, and
the electronic controller being configured to determine a rider's pedaling posture of a rider, the rider's pedaling posture including a standing and a sitting posture of the rider, the electronic controller being further configured to control the motor in accordance with a human driving force that is input to the human-powered vehicle and being configured to change responsivity of an output torque of the motor to a change in the human driving force in accordance with a rider's pedaling posture of a rider of the human-powered vehicle.

2. A human-powered vehicle control device comprising:
an electronic controller operatively coupled to a motor that assists in propulsion of a human-powered vehicle, and
the electronic controller being configured to control the motor in accordance with a human driving force that is input to the human-powered vehicle and being configured to change responsivity of an output torque of the motor to a change in the human driving force in accordance with a rider's pedaling posture of a rider of the human-powered vehicle,
the electronic controller being further configured to change in accordance with the rider's pedaling posture at least one of a first responsivity of the responsivity in a case in which the human driving force decreases or a second responsivity of the responsivity in a case in which the human driving force increases.

3. The human-powered vehicle control device according to claim 2, wherein
the electronic controller is configured to change the first responsivity in accordance with the rider's pedaling posture.

4. The human-powered vehicle control device according to claim 2, wherein
the electronic controller is configured to change the first responsivity so that a delay in changing the output torque of the motor with relation to a change in the human driving force is smaller in a case in which the rider pedals in a standing posture as compared to a case in which the rider pedals in a sitting posture.

5. The human-powered vehicle control device according to claim 2, wherein
the electronic controller is configured to change the second responsivity so that a delay in changing the output torque of the motor with relation to a change in the human driving force is smaller in a case in which the rider pedals in a standing posture as compared to a case in which the rider pedals in a sitting posture.

6. A human-powered vehicle control device comprising:
an electronic controller operatively coupled to a motor that assists in propulsion of a human-powered vehicle,
the electronic controller being configured to determine a rider's pedaling posture of a rider, the rider's pedaling posture including a standing and a sitting posture of the rider, the electronic controller being further configured to control the motor in accordance with a human driving force that is input to the human-powered vehicle so that an output torque of the motor is less than or equal to a predetermined value and being configured to change the predetermined value in accordance with a rider's pedaling posture of a rider of the human-powered vehicle, and
a rider's pedaling posture detector operatively coupled to the electronic controller to determine the rider's pedaling posture, the rider's pedaling posture detector including at least one of a frame force sensor, a handlebar force sensor, a roll direction inclination sensor, and a roll direction acceleration sensor.

7. The human-powered vehicle control device according to claim 6, wherein
the electronic controller is configured to increase the predetermined value in a case in which the rider pedals in a standing posture as compared to a case in which the rider pedals in a sitting posture.

8. The human-powered vehicle control device according to claim 1, wherein
the electronic controller is configured to change a ratio of the output torque of the motor to the human driving force in accordance with the rider's pedaling posture.

9. The human-powered vehicle control device according to claim 8, wherein
the electronic controller is configured to increase the ratio of the output torque of the motor to the human driving force in a case in which the rider pedals in a standing posture as compared to a case in which the rider pedals in a sitting posture.

10. The human-powered vehicle control device according to claim 1, further comprising:
a rider's pedaling posture detector operatively coupled to the electronic controller.

11. The human-powered vehicle control device according to claim 10, wherein
the rider's pedaling posture detector includes at least one of a crank force sensor, a pedal force sensor, a frame force sensor, a seatpost force sensor, a handlebar force sensor, a vehicle mounted camera, a roll direction inclination sensor, and a roll direction acceleration sensor.

12. A human-powered vehicle control device comprising:
an electronic controller operatively coupled to a motor that assists in propulsion of a human-powered vehicle in accordance with a human driving force that is input to the human-powered vehicle, and
the electronic controller being configured to change responsivity of an output torque of the motor to a change in the human driving force in accordance with the human driving force, the electronic controller being further configured to change in accordance with a rider's pedaling posture of a rider of the human-powered vehicle at least one of a first responsivity of the responsivity in a case in which the human driving force decreases or a second responsivity of the responsivity in a case in which the human driving force increases.

13. The human-powered vehicle control device according to claim 12, wherein
the electronic controller is configured to change the first responsivity in accordance with the human driving force.

14. The human-powered vehicle control device according to claim 13, wherein
the electronic controller is configured to change the first responsivity so that a delay in changing the output torque of the motor with relation to a change in the human driving force is smaller in a case in which the human driving force is greater than or equal to a first driving force as compared to a case in which the human driving force is less than the first driving force.

15. The human-powered vehicle control device according to claim 1, further comprising
a human driving force detector operatively coupled to the electronic controller.

16. The human-powered vehicle control device according to claim 2, wherein
the electronic controller is configured to change a delay in changing the output torque of the motor in a case in which the first responsivity is set to be greater than or equal to the delay in a case in which the second responsivity is set.

17. The human-powered vehicle control device according to claim 12, wherein
the electronic controller is configured to change a delay in changing the output torque of the motor in a case in which the first responsivity is set to be greater than or equal to the delay in a case in which the second responsivity is set.

18. A human-powered vehicle control device comprising:
an electronic controller operatively coupled to a motor that assists in propulsion of a human-powered vehicle, and
the electronic controller being configured to control the motor in accordance with a human driving force that is input to the human-powered vehicle so that an output torque of the motor is less than or equal to a predetermined value and being configured to change the predetermined value in accordance with the human driving force, the electronic controller being further configured to increase the predetermined value upon determining the human driving force is greater than or equal to a second driving force as compared to a case in which the human driving force is less than the second driving force.

* * * * *